March 18, 1930.  G. W. FRANKLIN  1,751,316

VEHICLE

Filed May 24, 1928  2 Sheets-Sheet 1

Inventor
G. W. Franklin

By
Attorney

March 18, 1930.   G. W. FRANKLIN   1,751,316
VEHICLE
Filed May 24, 1928   2 Sheets-Sheet 2
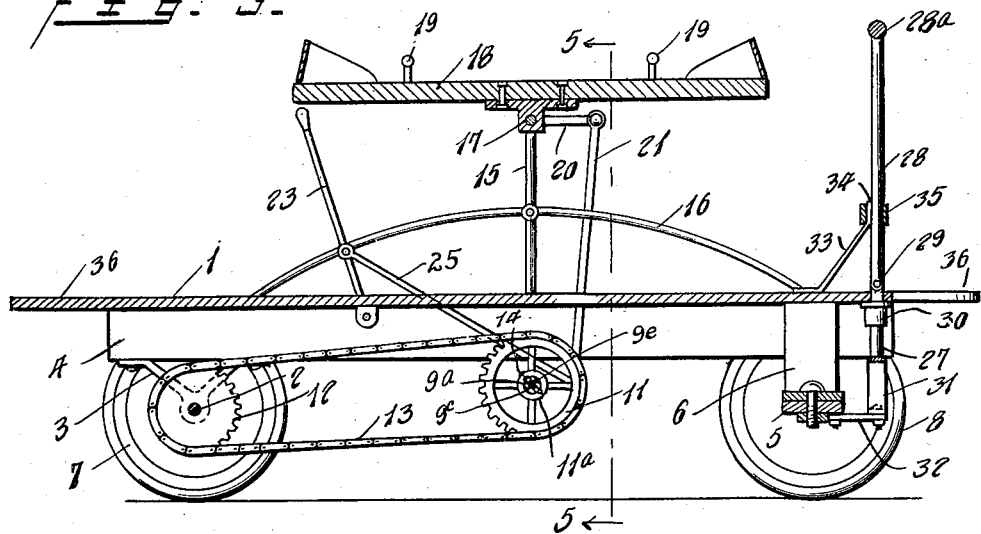
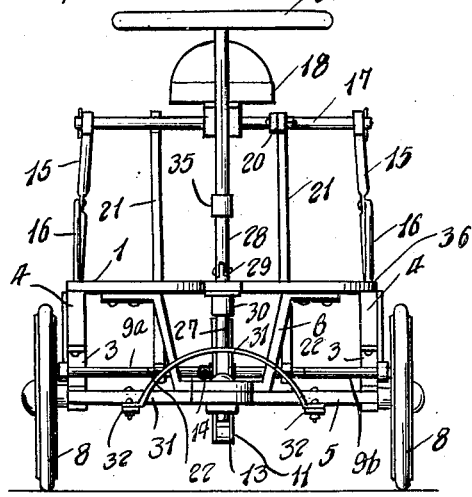
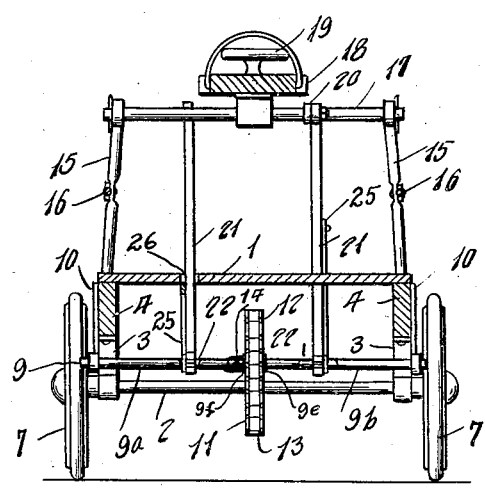
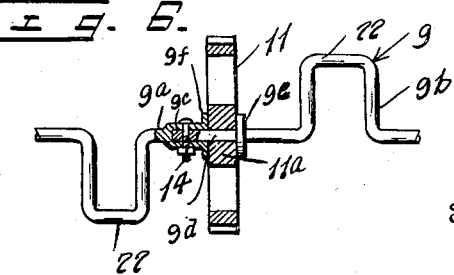
Inventor
G. W. Franklin
By
Attorney Patented Mar. 18, 1930

1,751,316

UNITED STATES PATENT OFFICE

GEORGE W. FRANKLIN, OF MUSKOGEE, OKLAHOMA

VEHICLE

Application filed May 24, 1928. Serial No. 280,258.

The invention relates to improvements in vehicles and has particular reference to children's vehicles, and has for its object the provision of a see-saw or teeter that may be utilized for actuating the vehicle or that may be actuated by movement of the vehicle when drawn, to add to the pleasure of the use of the article.

A further object of the invention is the provision of a vehicle having a body on which is journaled an axle having driving wheels secured thereto, a shaft also journaled on the body and geared to the axle, upright supports carried by the body and journaling a rock shaft having crank arms connected with crank stirrups on the first mentioned shaft, and a see-saw secured to the rock shaft and movable therewith.

A further object of the invention is the provision of a steering axle pivoted to swing in a horizontal plane and a steering shaft journaled in the body of the vehicle and connected with the steering axle by means of laterally extending arms and links pivotally connecting the ends of the arms and the axle, the steering shaft being made in two sections pivotally engaging each other and held in steering position by a slip ring engaging the shaft and a brace, said shaft being adapted to be released from engagement by the brace and to be used as a pulling means for the vehicle.

Figure 1:
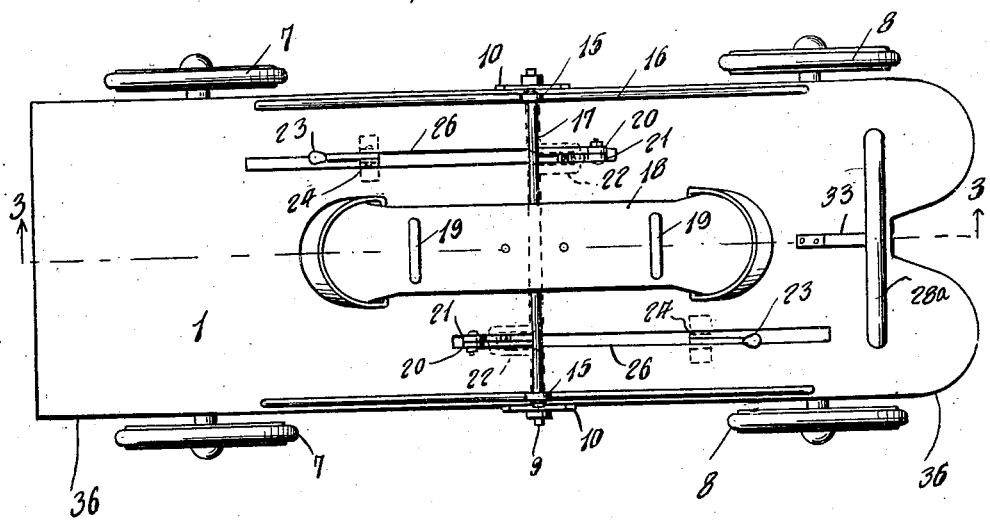
Figure 2:
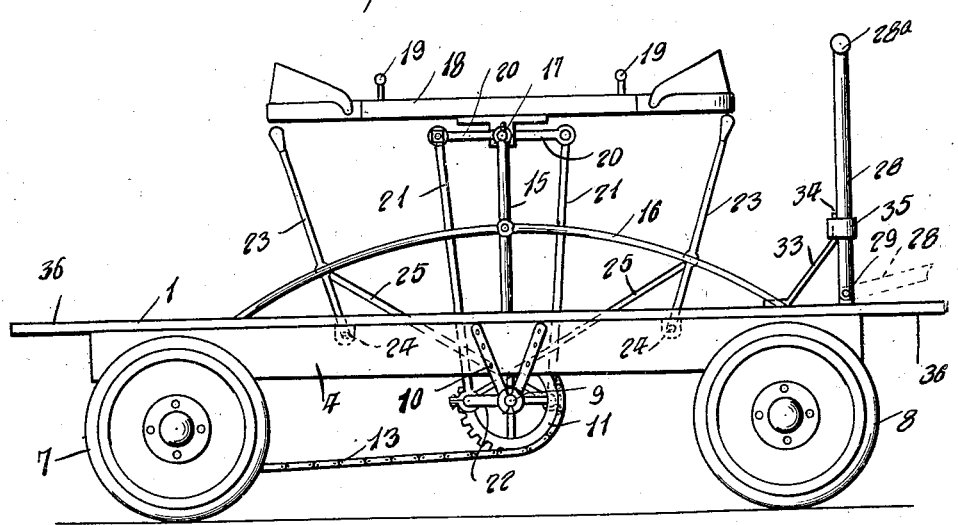

The invention will be described in detail hereinafter and will be found illustrated in the accompanying drawings in which Figure 1 is a top plan view of the improved vehicle, Figure 2 is a side view in elevation, Figure 3 is a longitudinal sectional view on a plane indicated by the line 3—3 of Figure 1, Figure 4 is a front end view, Figure 5 is a transverse sectional view on a plane indicated by the line 5—5 of Figure 3, and Figure 6 is a detail view showing means for securing a power wheel to the crank shaft.

In the drawings similar reference characters are used to designate corresponding parts throughout the several views.

The body of the vehicle 1 has a driving axle 2 held in a support 3 depending from the sills 4 of the body and a steering axle 5 pivotally engaging the support 6 secured to the body. The driving wheels 7 are secured for rotation with the axle 2 while the steering wheels 8 are journaled on the axle 5. 9 represents a crank shaft that is journaled in the supports 10 depending from the sills 4 and geared to axle 2 by means of a sprocket wheel 11 secured to the crank shaft 9, a sprocket wheel 12 secured to the axle 2 and a drive chain 13 trained over said sprocket wheel.

In Figure 6 is shown the means for securing the sprocket wheel 11 to the crank shaft 9 and consists in providing the crank shaft with two sections designated 9$^a$ and 9$^b$, the section 9$^a$ having a socket 9$^c$ polygonal in cross section to receive the polygonal end 9$^d$ of the section 9$^b$, the hub 11$^a$ having a polygonal opening to fit on said end 9$^d$. Shaft section 9$^b$ is provided with a flange 9$^e$ that engages one side of the wheel 11, and the end of the socket 9$^c$ is provided with a flange 9$^f$ engaging the opposite side of the wheel 11. 15 indicates upright rods carried by the body 1 and braced by the curved brace bars 16. 17 designates a rock shaft journaled in the upper ends of the supports 15 and 18 the see-saw board or teeter secured to said rock shaft and movable therewith, 19 designating hand holds on the see-saw board 18. 20 designates a crank arm extending from the rock shaft 17 and connected by means of links 21 with crank stirrups 22 on the shaft 9.

It will be apparent that when the see-saw 18 is rocked, the rocking movement imparted to the shaft 17 will through the links 21 impart a rotary motion to the crank shaft 9 and this rotary motion will be imparted to the axle 2 by means of the chain and sprocket gearing heretofore referred to, or if the vehicle is used for a coaster wagon or to be drawn by the instrumentalities to be hereinafter described it will be apparent that the movement of the vehicle will impart a rocking movement to the see-saw and thus add to the pleasure of the use of the vehicle by children.

23 indicates levers pivoted at 24 on the body 1 which may be connected by means of links 25 with the cranks 22 to supplement the power derived from the operation of the see-saw 18 when it is desired to do so, said links 25 when attached operating through elongated openings 26 in the body 1.

The steering mechanism comprises a steering shaft formed of two sections designated respectively 27 and 28, that are pivotally connected together as shown at 29. The section 27 is journaled in a sleeve 30 secured to the body 1 and has laterally extending arms 31 secured thereto and connected by links 32 with the steering axle 5. The upper end of the steering shaft 28 is held in vertical position and axially alined with the section 27 by means of a brace 33 having an upright end 34 that is engaged by a slip ring 35 on the section 28 and when in the position shown in the drawings the section 28 with its cross head 28$^a$ may be used for steering the vehicle when it is used for a coaster wagon, or when it is being driven by the see-saw 18 or the levers 23.

A section of the steering shaft 28 may, however, be used as a tongue for pulling the vehicle by releasing the upright portion 34 of the brace 33 from engagement by the slip ring 35 thus permitting the section 28 to move into a substantially horizontal position as shown in broken lines in Figure 2.

The body of the vehicle is provided with front and rear extensions 36, that provide seats, the front extension being in two parts as shown to permit lowering of the shaft 28 as hereinbefore stated.

What is claimed is:—

In a vehicle, a body, an axle journaled in the body, driving wheels secured for rotation with said axle, a shaft journaled on the body and geared to the axle, crank stirrups on said shaft, uprights supported on the body, a rock shaft journaled in said uprights, crank arms on said rock shaft, links connecting said crank arms and crank stirrups, and an operating member secured to said rock shaft.

In testimony whereof I affix my signature.

GEORGE W. FRANKLIN.